(No Model.)
J. THEOBALD.
Adjustable Nut.
No. 242,074.              Patented May 24, 1881.
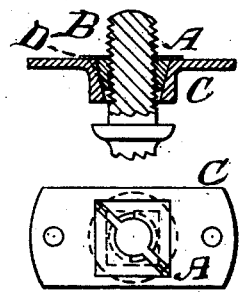
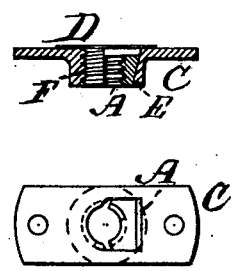
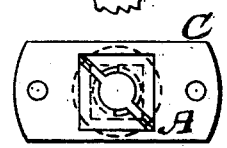
Attest:
Geo. B. Adams
Chas. F. Stimmel
Inventor.
John Theobald
By Horace Harris
Atty

United States Patent Office.

JOHN THEOBALD, OF NEWARK, NEW JERSEY, ASSIGNOR OF ONE-HALF TO JOHN M. GWINNELL, OF SAME PLACE.

ADJUSTABLE NUT.

SPECIFICATION forming part of Letters Patent No. 242,074, dated May 24, 1881.

Application filed January 31, 1881. (No model.)

*To all whom it may concern:*

Be it known that I, JOHN THEOBALD, of Newark, in the county of Essex and State of New Jersey, have invented a new and useful Improvement in Adjustable Nuts, of which the following is a specification.

My invention relates to an improvement in nuts for bolts or screws to be used in any position where there is a liability to be required or casually to be used bolts having slightly-varying diameters necessitating a change of nut with every change of bolt, or else an agreement by tapping over; but with my invention I make one nut answer for bolts of different sizes.

My invention consists in making a divided nut and placing it in a socket with beveled side or sides, as will be herein set forth.

Figure 1 is a longitudinal section. Fig. 2 is a plan of the same. Figs. 3 and 4 show a modification; Fig. 5, a detailed view.

The nut A is divided longitudinally, leaving a part to come on each side of the bolt B. It may be divided so that there will be one, two, or more sections, and the division may be transversely of the diameter of the nut or diagonally, as seen in Fig. 2, or on any other line. This divided nut, having beveled outsides, (see Figs. 1 and 2,) is placed in a socket, C, having beveled insides corresponding to the outside of the nut. On the broad opening in the socket, after the nut has been inserted, is secured the plate D, to prevent the nut from working out when not engaging a bolt. It can never loosen or work out when the bolt has once been tightened up.

Now it will be seen that when a bolt is entered in the nut, as in Fig. 1, the sections of the nut spread apart and slide up the beveled plane in the socket. Fig. 3 shows a provision for it, and is at once adapted to the bolt and to bolts of various diameters, while the action of the screw in turning the bolt will drawn down the nut and make it perfectly tight in the socket.

Instead of having the nut in two sections, as above described, it may be in one, as seen in Figs. 3 and 4. In that case the socket is made with but one beveled side, E, and one straight side, F, and this latter is tapped (screw-threaded) to engage one side of the bolt, while the one section of the nut, sliding in the socket, provides for the different diameter of the bolts; or, in the place of the sections of the nut sliding, they may be—one or both of them—hung eccentrically in the socket and do the same thing.

The socket will ordinarily be secured so that it will not turn, and it may be in the article where the bolt and nut are used; but it may be made to turn as an ordinary nut.

This invention has especial adaptation to saddle-trees, where, in attaching the trimmings and in changing styles, there is often found in the screw-shanks of terrets, hooks, &c., different diameters, necessitating the taking apart of a pad to insert a new nut with every varying diameter of shank; but with my nut once in place shanks varying an eighth of an inch may be readily inserted. So in other places much more difference in the size of bolts is provided for, making the adjustable nut of great value in many places, as well as providing a positive lock-nut.

I claim—

1. The combination of the socket C, divided nut A, and plate D, substantially as and for the purpose specified.

2. The adjustable nut having one of its sections adapted to be moved longitudinally in the socket C, and the other integral with the socket, substantially as and for the purpose set forth.

JOHN THEOBALD.

Witnesses:
HORACE HARRIS,
R. S. STEADMAN.